(12) United States Patent
Gregoire et al.

(10) Patent No.: US 6,328,207 B1
(45) Date of Patent: Dec. 11, 2001

(54) METHOD AND APPARATUS FOR AUTOMATED CASHING OF CHECKS

(75) Inventors: Kevin P. Gregoire, Sparta; Hope L. Kirschner, Boonton Morris County, both of NJ (US); Dale H. Dentlinger, Naperville, IL (US); L. Joy Griebenow, Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/132,365

(22) Filed: Aug. 11, 1998

(51) Int. Cl.[7] ...................................................... G06F 17/60
(52) U.S. Cl. ............................................. 235/379; 705/45
(58) Field of Search ..................................... 235/379, 380; 283/57, 58; 705/35, 39, 43, 44, 45

(56) References Cited

U.S. PATENT DOCUMENTS

| | | | |
|---|---|---|---|
| 4,109,238 | * | 8/1978 | Creekmore ........................... 340/149 |
| 4,617,457 | * | 10/1986 | Granzow et al. .................... 235/379 |
| 5,592,377 | * | 1/1997 | Lipkin ................................... 395/242 |
| 5,897,625 | * | 4/1999 | Gustin et al. ........................... 705/43 |
| 6,038,553 | * | 3/2000 | Hyde, Jr. ................................ 705/45 |

* cited by examiner

Primary Examiner—Thien M. Le
Assistant Examiner—Larry D Taylor
(74) Attorney, Agent, or Firm—Baker Botts L.L.P.

(57) ABSTRACT

A customer at an enrollment section (12) uses a self-dial telephone (14) to make a toll-free call to a customer service operator at a workstation (26). The operator activates a check-cashing card (18) obtained by the customer at the enrollment section, which includes enrolling a checking account against which the customer wishes to cash checks. The customer can subsequently use the activated card with automatic teller machines (57) to cash checks in transactions that are entirely automated, and that do not require the customer to have funds available for withdrawal from an institutional account. Each automatic teller machine interacts with a switch system (42), which in turn interacts with a host system (37), in order to determine whether to proceed with the check-cashing transaction. If authorization is granted, a dispense amount is determined by deducting one or more fees from the amount of the check, and the customer is then paid the dispense amount in cash.

10 Claims, 8 Drawing Sheets

METHOD AND APPARATUS FOR AUTOMATED CASHING OF CHECKS

STATEMENT REGARDING COPYRIGHT RIGHTS

A portion of this patent disclosure is material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

This invention relates in general to cashing of checks and, more particularly, to a method and apparatus that facilitate automated cashing of checks.

BACKGROUND OF THE INVENTION

A customer of a bank, who has one or more funds-containing accounts with the bank, will frequently use an automatic teller machine (ATM) to perform transactions which are entirely automated. Under certain circumstances, it may appear to the customer that he or she is using the ATM for a transaction in which he or she submits a check and simply receives cash in return, seemingly without reference to the customer's bank account. In reality, however, the customer's bank account does figure into the transaction.

More specifically, the ATM verifies that the customer has a funds-containing account. The ATM may require that the account contain funds which are available for withdrawal in an amount which is part or all of the check amount. This is because a bank may limit the withdrawal of funds from an account for several days after those funds were deposited, until the check used to deposit them has had time to be refused. Alternately, or in addition, the ATM may put a "hold" on funds in the account, in an amount which is part or all of the check amount. If the customer does not have an institutional account, if there are not enough total funds in the account, or if there are not enough funds in the account which are available for withdrawal, the check-cashing transaction may be refused in whole or in part.

There are other persons who, for one reason or another, do not maintain a bank account, but still need to cash checks. These persons are sometimes referred to as the "unbanked". When an unbanked person has a check to cash, he or she goes to a convenience store, a grocery store, or some other store, and deals directly with a human clerk rather than a terminal such as an ATM. The store will normally charge a service fee for cashing the check, and some states place an upper limit on the amount of the service fee which may legally be charged.

There are a few terminals which are available for use by unbanked persons. However, these terminals do not implement an automated check-cashing transaction. Instead, they provide an audiovisual link between the customer and a human operator at a remote location. The remote operator can visually and verbally interact with the customer, to determine whether to authorize the transaction. For example, the operator may ask the customer to present a driver's license, and/or some other identification, and may visually observe each such document presented. Thus, the transaction is based entirely on human interaction, and is very similar to the situation in which the customer cashes a check at a convenience store through direct interaction with a human sales clerk.

Sometimes, a terminal of this type will have some additional capability which facilitates biometric analysis. For example, the terminal may permit scanning of the face of the person so that certain features can be compared to known parameters, in order to help the remote operator verify that the customer is in fact who he or she claim to be, and thus determine whether to authorize the check-cashing transaction.

Although check-cashing arrangements of the type discussed above have been generally adequate for their intended purposes, they have not been satisfactory in all respects. In particular, in the case of an unbanked person, the person must interact with another human, either in person or through an audiovisual interface. For each such check-cashing transaction, a certain amount of time is necessarily required for the other person to examine identification and otherwise determine whether or not to authorize the check-cashing transaction. Thus, the overhead costs associated with the human clerk or operator can be relatively significant. Therefore, and since some states put upper limits on the amount of the service fee which may be charged for cashing some or all types of checks, the potential profit represented by the difference between the service fee and the overhead cost may be minimal, even when the maximum allowable service fee is charged. This may discourage some stores from providing a check-cashing service for the unbanked.

SUMMARY OF THE INVENTION

From the foregoing, it may be appreciated that a need has arisen for a method and apparatus for cashing a check in a truly automated manner, and without the need for the person holding the check to have an account containing funds which are available for withdrawal. According to the present invention, a method and apparatus are provided to address this need, and involve: automatically determining whether to permit a person to cash a check, without evaluating whether the person has funds available for withdrawal from a funds-containing account; and automatically responding to a determination that cashing of the check is permissible by dispensing cash to the person in exchange for the check.

BRIEF DESCRIPTION OF THE DRAWINGS

A better understanding of the present invention will be realized from the detailed description which follows, taken in conjunction with the accompanying drawings, in which:

FIGS. 3A–3D is a flowchart of one exemplary procedure carried out by an automatic teller machine which is a component of the system of FIG. 1, in order to implement automated check cashing in accord with the present invention;

DETAILED DESCRIPTION OF THE INVENTION

Figure 1:
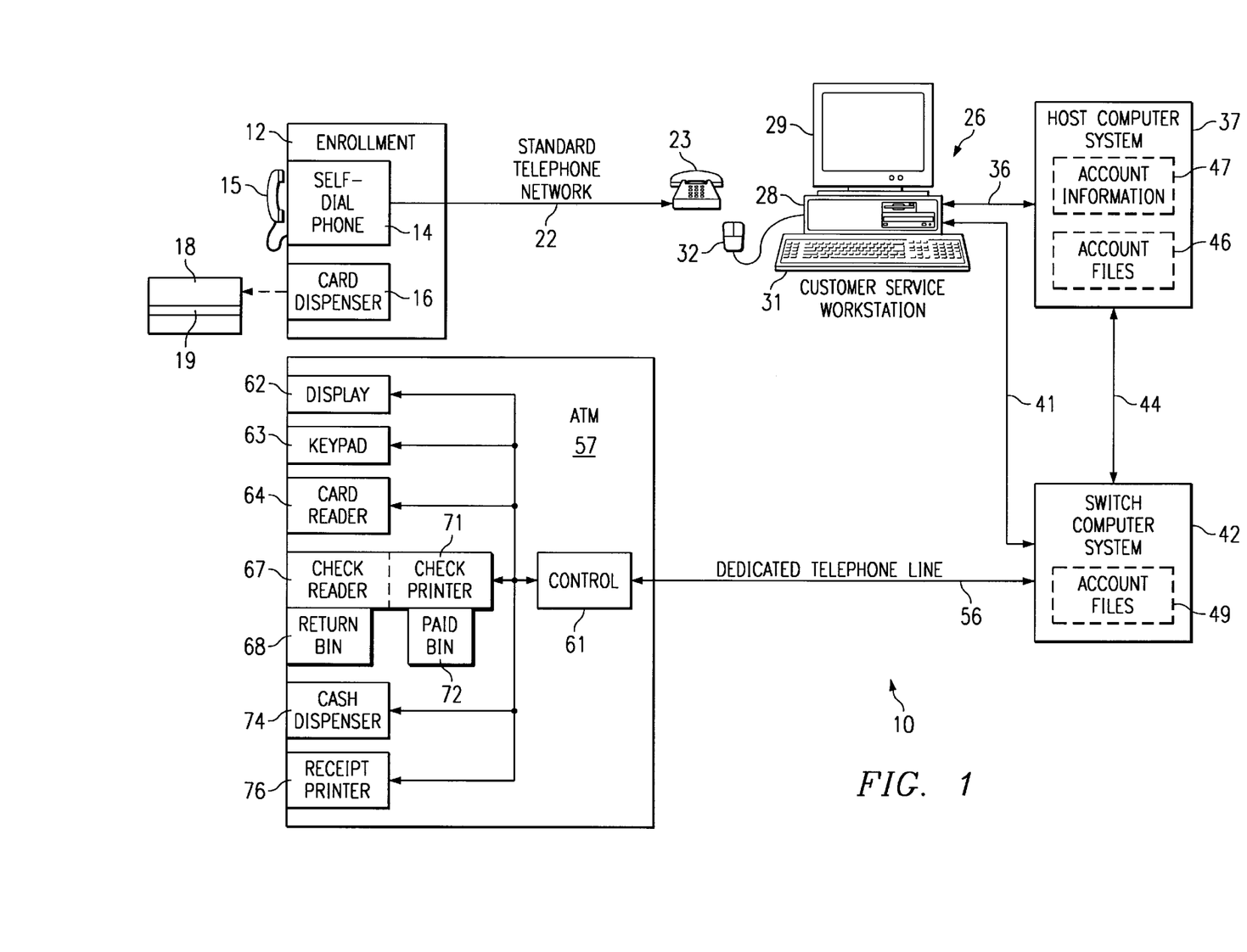
FIG. 1 is a block diagram of a system which can be used to effect automated check cashing in accord with the present invention.

FIG. 1 is a block diagram of a system 10 which can be used to practice the present invention. In particular, the system 10 allows automated check cashing, without regard to whether the person cashing the check has a bank account or other institutional account containing funds.

The system 10 includes an enrollment section 12, which has a self-dial telephone with a handset 15. When the handset 15 is manually picked up, the telephone 14 automatically dials a predetermined toll-free telephone number, as discussed in more detail later. The enrollment section 12 also includes a card dispenser 16 that dispenses check-cashing cards, one of which is shown at 18. In the preferred embodiment, the check-cashing card 18 is similar in structure and appearance to a credit card, in that it is made of plastic and has a magnetic stripe 19 with information magnetically recorded thereon. The card 18 also has thereon a visible card number, which is also recorded on the magnetic stripe. The disclosed card dispenser 16 is not a secure device, and dispensing of cards is not controlled from a remote location. Any person can simply remove a card from the card dispenser 16. However, the card dispenser 16 is preferably designed to allow only one card to be removed at a time. Moreover, when a card 18 is removed from the card dispenser 16, the card is not operational until it is activated, in a manner described in more detail later.

The self-dial telephone 14 is coupled through a standard system of telephone lines 22 to a telephone 23, which is in close physical proximity to a customer service workstation 26. The workstation 26 may be a known type of personal computer, and may include a processor unit 28, a display 29, a keyboard 31, and a pointing device 32 such as a mouse.

The workstation 26 is coupled through a communication link 36 to a host computer system 37. The communication link 36 may, for example, be an ISDN connection. The workstation 26 is coupled through further communication link 41 to a switch computer system 42. The communication link 41 may, for example, be a dial-up communication link. The host computer system 37 and switch computer system 42 are coupled to each other through a further communication link 44. The link 44 may, for example, be a frame relay communication link. In the disclosed embodiment, the workstation 26, host computer system 37 and switch computer system 42 are at different physical locations which are remote from each other.

The host computer system 37 has a plurality of account files 46 stored therein, each of which corresponds to a respective check-cashing card 18. Further, the host computer system 37 stores additional account information 47, which relates to checking accounts on which checks to be cashed are issued. The switch computer system 42 has stored therein a plurality of account files 49, each of which corresponds to a respective check-cashing card 18.

The switch computer system 42 is preferably coupled through a leased, dedicated telephone line 56 to an automatic teller machine (ATM) 57, and in particular to a control unit 61 within the ATM 57. The ATM 57 includes a display 62 which is controlled by the control unit 61, and a keypad 63 on which a customer can provide input to the control unit 61. The ATM 57 further includes a card reader 64 which is coupled to the control unit 61, and which can removably receive a check-cashing card 18 and read information from the magnetic stripe 19 thereon. Alternatively, the card reader could be a device of the type in which the card is slid or "swiped" though a slot while the information on the magnetic stripe is read, rather than a device into which the card is physically inserted.

The ATM 57 further includes a check reader 67, which can accept and scan a check to be cashed. The check reader 67 can then, under control of the control unit 61, route the check into a return bin 68, or route the check through a check printer 71 to a paid bin 72. A check is routed to the return bin 68 if it cannot be processed, and a customer can then retrieve the check from the return bin 68. On the other hand, if the check is processed, then the check is passed from the check reader 67 through the check printer 71 to the paid bin 72. The paid bin 72 is preferably a secure bin, from which processed checks are periodically collected, for example every two or three days.

The ATM 57 includes a cash dispenser 74, which is controlled by the control unit 61, and which can be instructed to dispense a specified amount of cash in coins and bills to a customer. The cash dispenser includes several cassettes, which are not illustrated, and which each contain paper currency or metal coins that can be dispensed to a customer. The ATM 57 also includes a receipt printer 76, which can print a paper receipt for a customer in order to document a check-cashing transaction.

For convenience and clarity, FIG. 1 shows only one enrollment section 12 and only one ATM 57. However, the system 10 preferably includes a plurality of enrollment sections 12, which each have a self-dial telephone 14 that can place a telephone call to the telephone 23. Further, the system 10 preferably includes a plurality of ATMs 57, which are each linked by a respective dedicated telephone line 56 to the switch computer system 42. Moreover, in the preferred embodiment, each of the plural ATMs 57 is located in close physical proximity to a respective one of the enrollment sections 12. For example, each enrollment section 12 and the associated ATM 57 may be located in a common kiosk, for example within a convenience store or a grocery store.

The enrollment section 12 is used to effect initial enrollment of a customer into the check-cashing program, including the dispensing and activation of the check-cashing cards 18. In more detail, a customer may step up to the enrollment section 12, where he or she will begin by reading brief instructions that are preferably posted in close proximity to the self-dial telephone 14. The instructions explain that a customer must enroll before it is possible to cash a check, and explain that the customer can initiate enrollment by simply picking up the handset 15 of the self-dial telephone 14.

When the customer does pick up the handset 15 of the self-dial telephone 14, the telephone 14 automatically dials a toll-free telephone number, which causes the telephone 14 to become coupled to the telephone 23 through the telephone network 22. The telephone 23 will be answered by a customer service operator at the workstation 26. Through the telephone connection, the customer service operator will take the customer through an enrollment procedure, which is shown diagrammatically in FIG. 2 and which is explained in more detail below. As will become more evident from the description below, the human operator is involved only for the enrollment process, and possibly for subsequent problem resolution. The actual check-cashing transactions are entirely automated, with no human involvement (other than the customer who is cashing the check).

Figure 2:
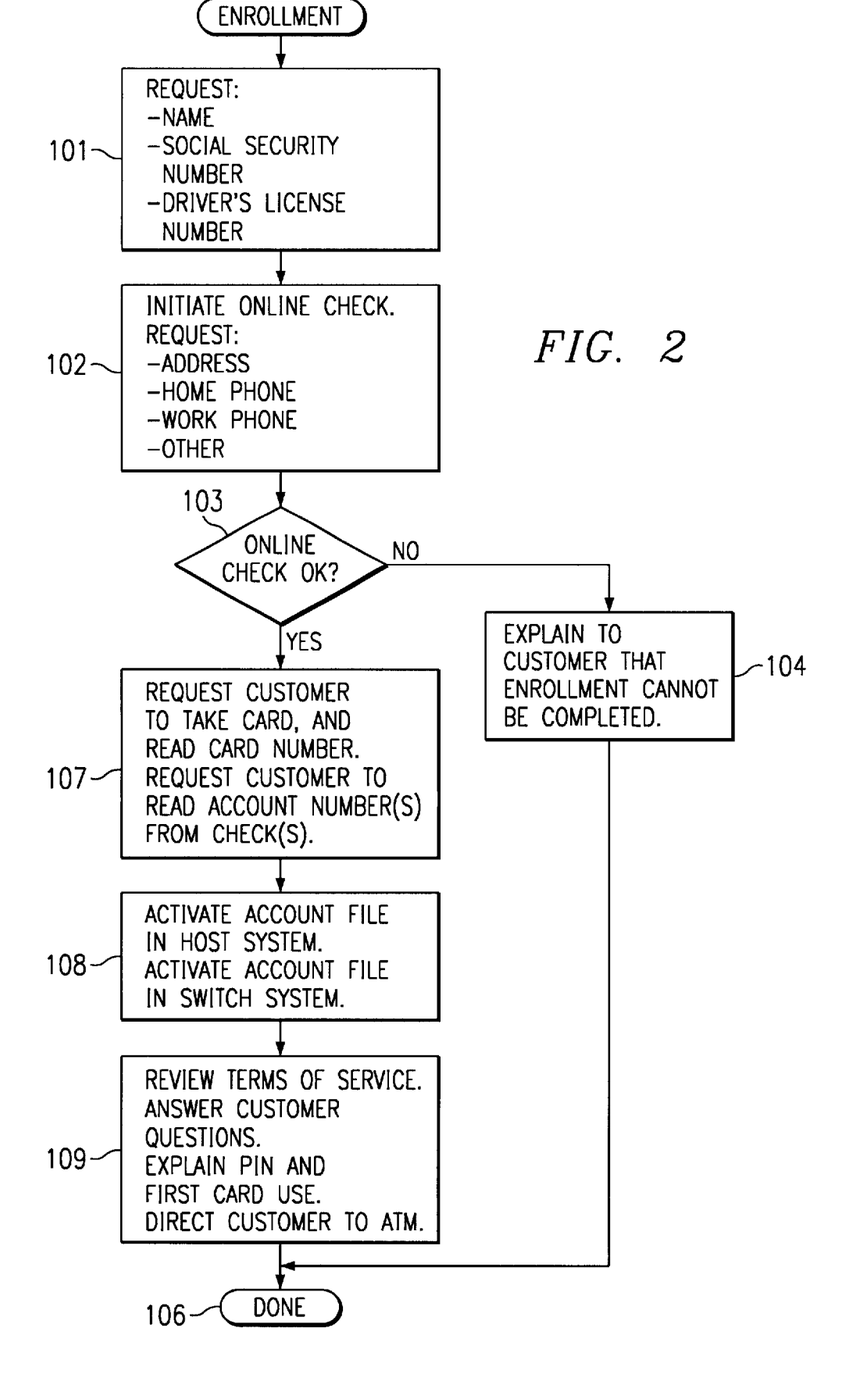
FIG. 2 is a flowchart of one exemplary procedure for enrolling a potential customer in an automated check-cashing service which is implemented by the system of FIG. 1.

More specifically, with reference to FIG. 2, at block 101 the customer service operator requests that the customer give information such as his or her name, social security number and driver's license number. Then, at block 102, the operator uses the workstation 26 to initiate an on-line check of this information. In particular, the workstation 26 establishes communication with a remote computer system which is not illustrated, and which can verify that the name, social security number and/or driver's license number given by the prospective customer correspond to each other and are accurate and valid.

While waiting for the remote computer to provide results from this on-line check, the operator requests some additional information from the prospective customer, such as his or her address, home telephone number, work telephone number, and so forth. By the time this information has been entered into the workstation 26 and has been orally verified with the prospective customer, the results of the on-line check should be available at the workstation 26. At block 103, the operator checks the results of the on-line check to see if the on-line check revealed any problem with the information collected in block 101. If a problem was found, then at block 104 the operator cordially explains to the prospective customer that there is a problem and that enrollment cannot be completed, and then terminates the telephone conversation and the enrollment procedure at 106.

On the other hand, if the operator determines at 103 that the on-line check did not reveal a problem, then at 107 the operator instructs the customer to take a check-cashing card 18 from the card dispenser 16. As mentioned above, each of the cards 18 has associated with it a unique card number, which is printed on the card, and which is also magnetically recorded on the magnetic stripe 17 of that card. The operator asks the customer to read the card number which is printed on the card 18. Alternatively, a reader device could be provided, and the customer could swipe or insert the card in order to automatically determine the card number, thereby avoiding the need to have the customer read the card number.

Then, the operator asks the prospective customer to identify the account number of each checking account against which the customer intends to cash checks with this card. This will normally be an account owned by someone other than the customer. For example, if the customer intends to cash payroll checks from an employer, this will be an account number of a payroll checking account owned by the employer. Alternatively, if the customer intends to cash social security checks, this will be the account number of a checking account owned by a government agency. If the customer has a check in hand, the customer service operator can obtain the account number by having the customer read the Magnetic Ink Character Recognition (MICR) line printed along the lower edge of the check. Alternatively, a check reading device could be provided, and the customer could insert the check into reader in order to have the reader read the MICR line, thereby avoiding the need to have the customer read the account number from the check. It will also be recognized that the account number could be checked at a different point in the enrollment procedure.

When the customer later seeks to cash a check, the system 10 will cash the check only if it has been properly enrolled in association with the check-cashing card. During initial enrollment, the customer will enroll at least one checking account number in association with the particular check-cashing card 18, and may enroll more than one account. At some future time, the customer may optionally enroll additional checking account numbers for that same check-cashing card 18, by using the self-dial telephone 14 at some enrollment section 12 in order to again contact an operator at the customer service workstation 26.

At 108, after the customer service operator has entered one or more checking account numbers into the workstation 26, the operator uses the workstation 26 to activate a respective account file 46 in the host computer 37. This particular account file 46 corresponds to the particular check-cashing card 18. Similarly, the operator uses the workstation 26 to also activate a respective account file 49 in the switch computer system 42, and this account file 49 also corresponds to the same check-cashing card 18.

Then, at 109, the customer service operator briefly reviews the terms of service with the customer, and answers any questions which, for example, the customer may have. The customer service operator explains to the customer that there is a one-time enrollment fee for the enrollment process, which will be collected the first time the customer uses the card to cash a check. The customer service operator also explains to the customer that, the first time the customer uses the card to cash a check, preferably he or she will need to provide a personal identification number (PIN), selected by the customer. Alternatively, the PIN could be automatically assigned. Thereafter, the selected PIN will be associated with that particular card, and the customer will need to enter that PIN in order to carry out each subsequent check-cashing transaction.

The customer service operator then directs the customer's attention to the ATM 57 which is located physically adjacent to the enrollment section 12, and advises the customer that the customer may immediately use the ATM 57 to cash a check, if the customer wishes to do so. Then, or at some future time, the customer may use the ATM 57 to cash a check, in a manner described in more detail below. Although the foregoing enrollment procedure involves interaction with a human customer service representative, a given customer completes this enrollment procedure only once for any given account against which the customer wishes to cash checks. Thereafter, the customer can carry out a number of check cashing transactions against any enrolled account in a completely automated manner, as described below.

As described above in association with FIG. 2, the disclosed embodiment involves an enrollment procedure in which a prospective customer uses the self-dial telephone 14, and takes a check-cashing card from the dispenser 16. However, there are variations of this which are within the scope of the present invention. For example, the customer may be mailed an inactive check-cashing card 18, and the toll-free telephone number for the telephone 23. The prospective customer may then call the toll-free number from his or her home telephone, or any other convenient telephone, in order to carry out the described enrollment procedure and thereby obtain activation of the check-cashing card.

Figure 3A:
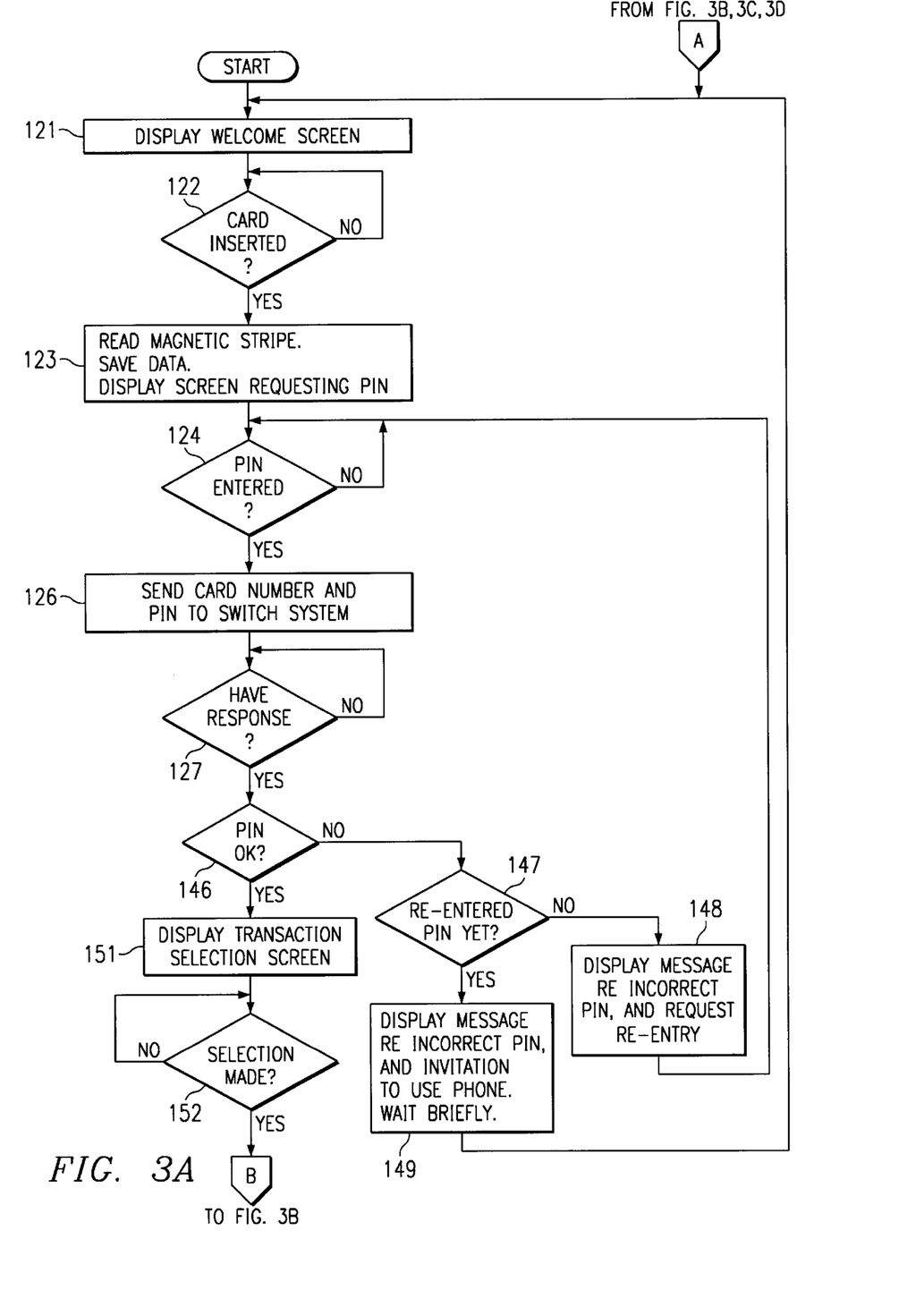
Figure 3B:
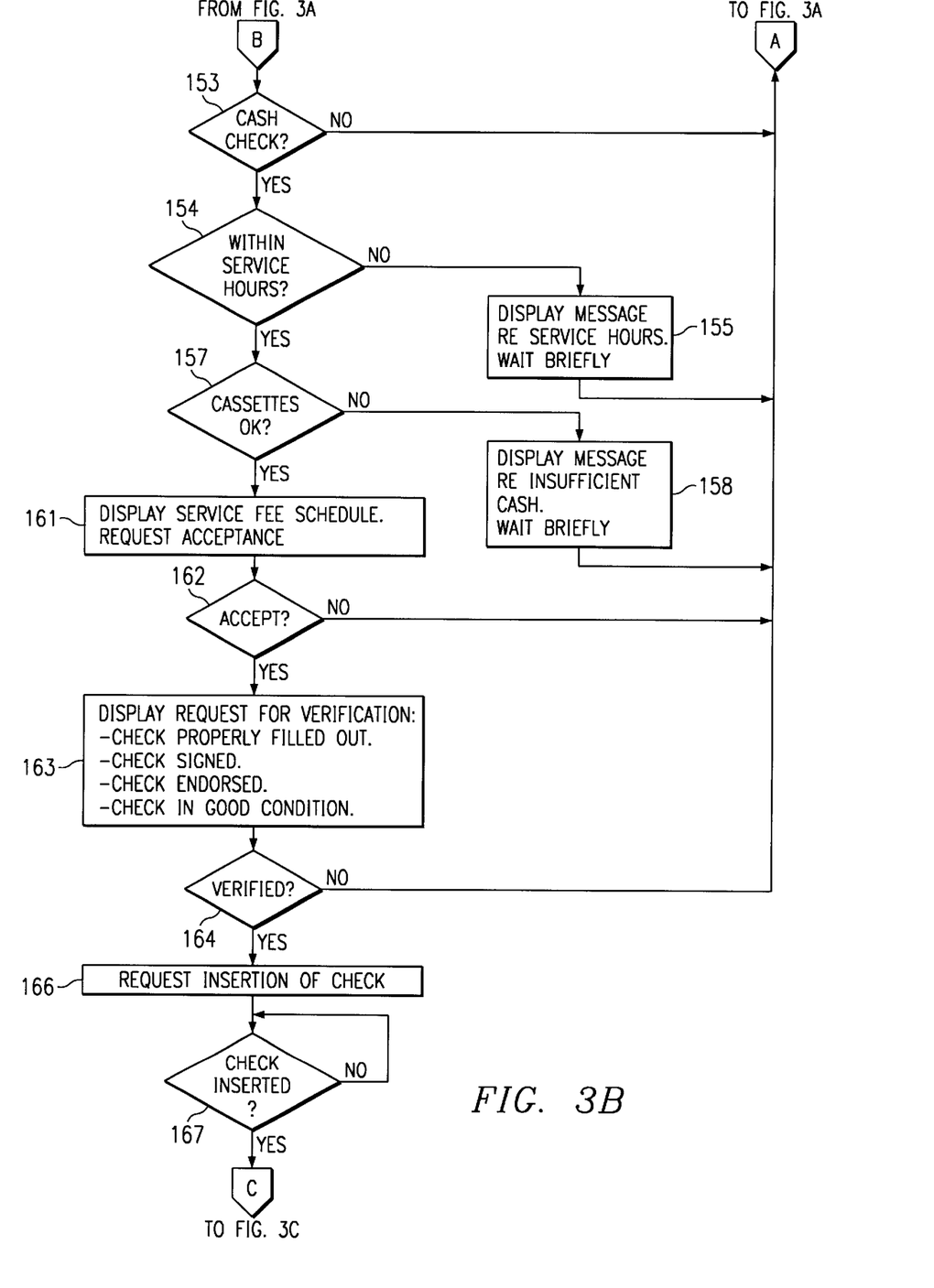
Figure 3C:
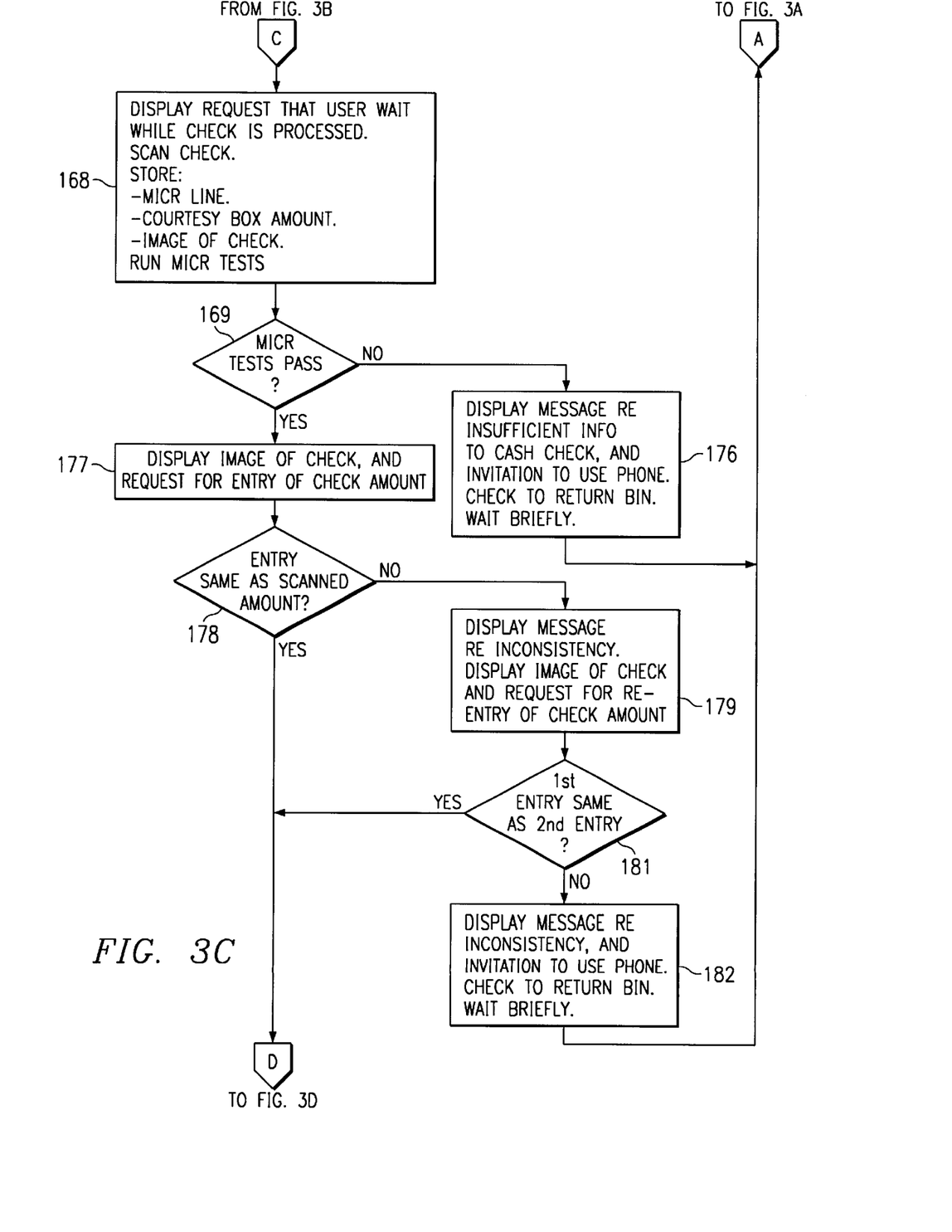
Figure 3D:
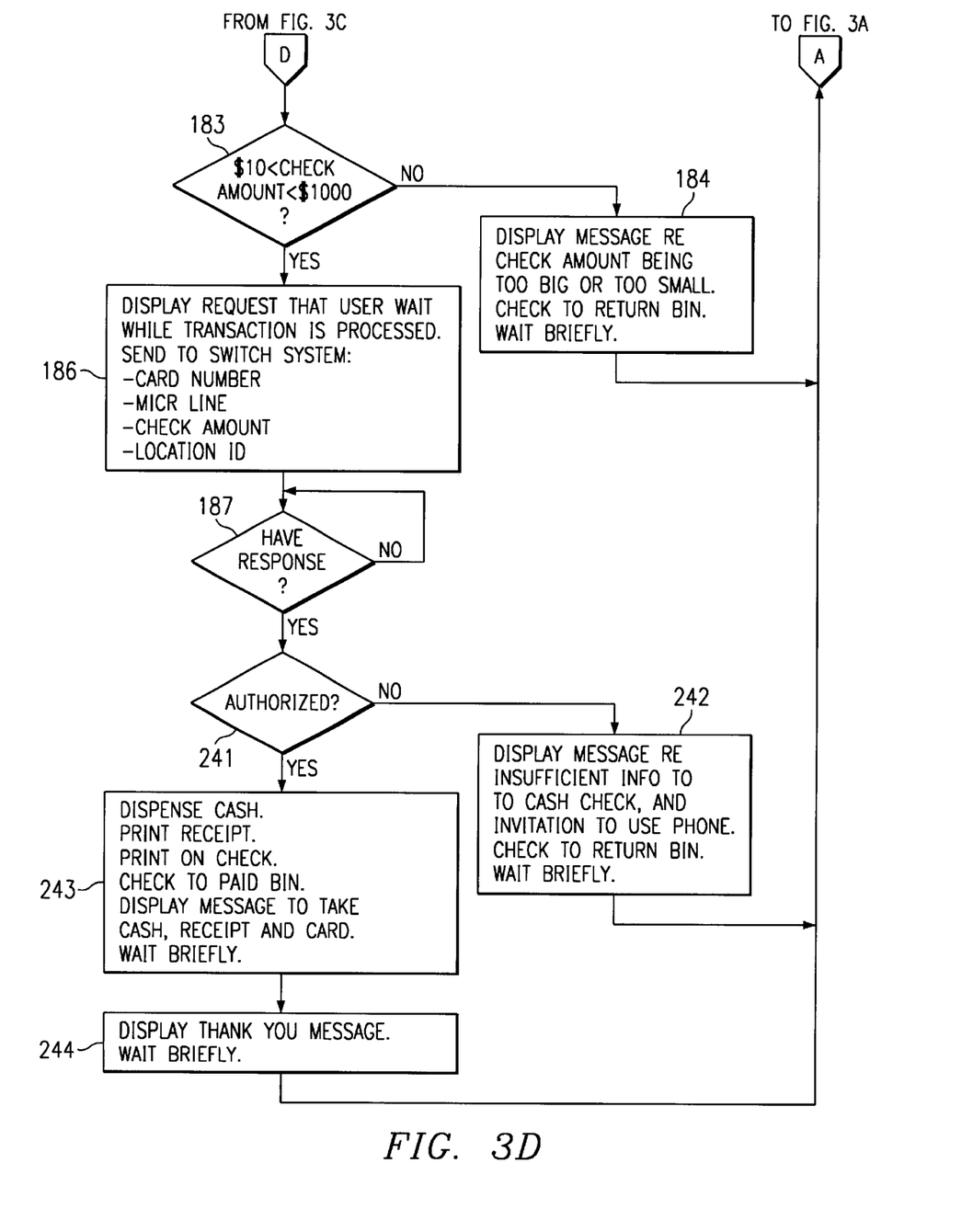

The operation of the ATM 57, and the manner in which the cashing of a check is handled, will now be described in more detail with reference to FIGS. 3 through 6. FIG. 3A–3D is a flowchart showing the operation of the ATM 57, under control of the control unit 61. At block 121 in FIG. 3A–3D, the ATM 57 displays on the display 62 a welcome screen, which invites the customer to begin a transaction by inserting a card. In the preferred embodiment, the ATM 57 is capable of handling not only the check-cashing cards 18 discussed above in association with FIG. 1, but also a number of other pre-existing ATM cards. However, the other ATM cards and the manner in which they are handled is known. Therefore, for convenience and clarity, the manner in which other ATM cards are handled has been omitted from the drawings, and the following discussion focuses specifically on how the ATM 57 processes a check-cashing card 18 in accord with the invention.

Also, in the preferred embodiment, the ATM 57 has the capability to allow a customer to cancel a check-cashing transaction at any time, for example by pressing a "cancel" key on the keypad 63. Similarly, if a customer simply walks away from the ATM 57 after starting a transaction, the ATM 57 has the capability to detect that it has not received a response within a predetermined time interval, and to then automatically cancel the transaction and return to the welcome screen mentioned above. For clarity, these capabilities to manually or automatically cancel a transaction have been omitted from the flowchart of FIGS. 3A–3D.

At block 121, and as mentioned above, the ATM 57 displays a welcome screen which invites a customer to insert a card, such as an ATM card, or a check-cashing card 18. At block 122, the ATM 57 waits for some customer to insert a card. A customer initiates a check-cashing transaction by stepping up to the ATM 57, and inserting a check-cashing card 18 into the card reader 64. When the customer inserts a card 18, control proceeds from block 122 to block 123, where the ATM 57 reads the magnetic stripe 19 on the card, which includes information such as the card number. Then, the ATM 57 presents a message on the display 62, which asks the customer to use the keypad 63 to enter his or her PIN number. At block 124, the ATM 57 waits for entry of the PIN. When the customer has entered a PIN, control proceeds to block 126, where the ATM 57 uses the dedicated telephone line 56 to send a PIN inquiry to the switch system 42, along with the card number and the entered PIN. Then, at block 127, the ATM 57 waits for a response from the switch system of 42. In the meantime, the switch system 42 processes the PIN inquiry, in a manner which will now be discussed in more detail with reference to FIG. 4.

Figures 4, 5:
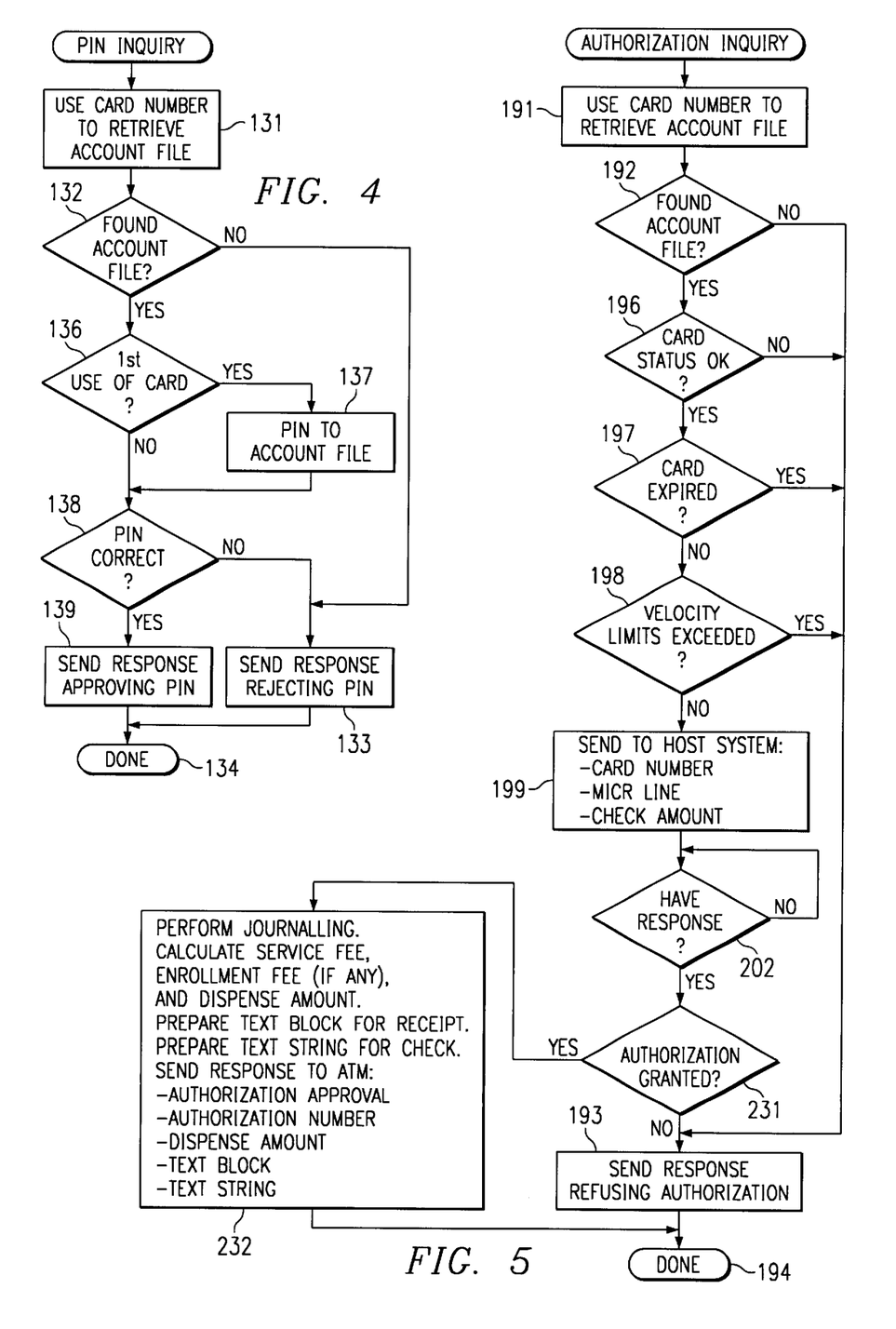
FIG. 4 and FIG. 5 are flowcharts showing respective exemplary programs executed by a switch computer system which is a component of the system of FIG. 1, in order to effect automated check cashing in accord with the present invention.

More specifically, at 131 in FIG. 4, the switch system 42 uses the card number received from the ATM 57 to retrieve a respective account file 49, which is associated with that particular card. At 132, the ATM 57 checks to see if it found such an account file. If it did not, then the card may be counterfeit, inactive or otherwise invalid, and control proceeds to block 133, where the switch system 42 sends the ATM 57 a response which rejects the PIN and thus the card. Then, at block 134, the handling of the PIN inquiry is terminated by the switch system 42.

On the other hand, if it was determined at block 132 that the switch system 42 was able to locate an account file 49 corresponding to the particular check-cashing card 18, control proceeds from block 132 to block 136, where the switch system 42 checks the particular account file 49 to see if this is the first time since enrollment that the customer has cashed a check. If so, then control proceeds to block 137, where the PIN entered by the customer is stored in the account file 49, in order to set the PIN for all future use of the card. The PIN is preferably handled using existing PIN encryption techniques which are known to those skilled in the art. Control then proceeds from block 137 to block 138. Alternatively, if it was determined at block 136 that this was not the first use of this particular card, control would have proceeded directly from block 136 to block 138. At block 138, the switch system 42. compares the PIN entered by the customer at the ATM 57 to the PIN which is in the account file 49 for that card. If they agree with each other, then the PIN is correct, and control proceeds to block 139, where the switch system 42 sends to the ATM 57 a response which approves the PIN entered by the customer. Otherwise, control proceeds from block 138 to block 133, where the switch system 42 sends a response which rejects the PIN. Following each of blocks 133 and 139, the switch system proceeds to block 134 to terminate its handling of the PIN inquiry.

Referring again to FIGS. 3A–3D, and as discussed above, the ATM 57 waits at block 127 for the switch system 42 to respond to the PIN inquiry. When a response is received, control proceeds from block 127 to block 146, where the ATM 57 checks to see if the switch system 42 approved or rejected the PIN. If the PIN has been rejected, then control proceeds to block 147, where the ATM 57 checks to see if the customer has already entered the PIN a second time. If not, then control proceeds to block 148, where the ATM 57 displays on the display 62 a message which indicates that the previous-entered PIN is not correct, and which invites the customer to try again. Control then proceeds from block 148 to block 124, where the ATM 57 again waits for the customer to enter a PIN, and then checks the second entered PIN at blocks 126, 127 and 146, including the transmission of a further PIN inquiry to the switch system 42.

On the other hand, if it is determined at block 147 that the customer has entered a PIN twice, and that both entered PINs have been rejected, control proceeds from block 147 to 149, where the ATM 57 displays on the display 62 a message which indicates that the customer has not entered a correct PIN, and which invites the customer to use the self-dial telephone 14 to contact a customer service operator at the workstation 26. After displaying this message at 149, the ATM 57 waits briefly for several seconds, in order to give the customer time to read the message, and then proceeds from block 149 back to block 121 in order wait for the next customer. For purposes of the present discussion, it is assumed that the ATM terminates interaction with the customer if the customer enters two incorrect PINs. However, the ATM could allow the customer to enter more than two incorrect PINs before terminating the interaction.

Referring again to block 146, if the ATM 57 determines that the PIN entered by the customer has been approved by the switch system 42, then control proceeds to block 151, where the ATM 57 uses the display 62 to present a transaction selection screen. Then, at block 152, the ATM 57 waits for the customer to use the keypad 63 to select the particular transaction to be carried out. Although it is possible that there may be more than one type of valid transaction for the check-cashing card 18, the only type of transaction which is pertinent for purposes of the present discussion is selection of an option to cash a check. Therefore, when the customer makes a selection, control proceeds from block 152 to block 153, where the ATM 57 determines whether the customer has selected the option of cashing a check. If so, then control proceeds from block 153 to block 154. If not, then control proceeds from block 153 to block 121, where the ATM displays the welcome screen and waits for another customer. Alternatively, if some other type of transaction was also valid for the check-cashing card 18, control could proceed from block 153 to some other routine, which is not illustrated and which would handle those transactions.

In block 154, the ATM 57 preferably checks to see whether the current time is within specified service hours. As one example, service may be available from 7:00 AM to 12:00 PM, seven days a week. The hours of operation might be limited to coincide with the hours of operation of the store in which the ATM 57 is disposed, or for some other reason. If it determined that the current time is not within the specified service hours, then control proceeds from block 154 to block 155, where the ATM 57 uses the display 62 to display a message setting forth the hours during which the ATM 57 will provide check-cashing services, and inviting the customer to return at a time within the service hours. The ATM 57 waits briefly to give the customer an opportunity to read the message, and then control proceeds back to block 121, where the ATM 57 displays the welcome screen and waits for the next customer.

If it was determined at block 154 that the current time was within the established service hours, then control proceeds from block 154 to block 157, where the ATM 57 checks the not-illustrated cassettes within the cash dispenser 74, in order to determine the extent to which the cash dispenser 74 has cash which it can dispense in order to complete a check-cashing transaction. If it is determined at block 157 that the cash dispenser 74 does not have enough cash, then control proceeds from block 157 to block 158, where the ATM 57 displays on the display 62 a message indicating that there is insufficient cash to complete the transaction, and waits briefly in order to give the customer an opportunity to read the message. Control then returns to block 121, in order to display the welcome screen.

If is determined at block 157 that the cash dispenser 74 does contain an appropriate amount of cash, then control proceeds from block 157 to block 161, where the ATM 57 preferably uses the display 62 to present a schedule of service fees, and to request that the customer accept or reject the schedule of service fees. Then, at block 162, the ATM 57 waits for the customer to indicate acceptance or rejectance of the fee schedule. The fee schedule may vary from ATM to ATM and/or from region to region, based on factors such as the type of check, government regulations, and local market conditions. As one example, one ATM may cash only payroll checks, whereas another ATM may cash payroll checks as well as other types of checks, and the fee schedule for each ATM will preferably list only the fees for the particular types of checks accepted by that ATM.

As another example, the service fee may differ in dependence on whether the check is a payroll check, a government check, a personal check, or some other type of check. In this regard, government regulations may impose limits on the service fees which may be charged for certain types of checks. For example, one state may specify a maximum fee for a government check such as a social security check, but no maximum fee for other types of checks. Another state may specific different maximum limits for each type of check.

Another factor is the local market rate for check cashing, which is driven largely by competition within the area. For example, even within a given state, one city may support a 3% service fee for cashing payroll checks, while another city may support a 4.5% service fee. For any given ATM 57, the applicable fee for each type of check will be known. Thus, at block 161, the ATM 57 will preferably list various types of checks, and the associated service fee for each type. If the customer uses the keypad 63 to reject the fee schedule, control proceeds from block 162 back to block 121, where the ATM 57 displays the welcome screen and waits for the next customer.

Otherwise, control proceeds from block 162 to block 163, where the ATM 57 asks the customer to inspect the check and verify several things about the check. At this point in time, the customer has not yet inserted the check into the ATM 57. Therefore, in more detail, the ATM 57 asks the customer to verify (1) that the check is properly filled out, (2) that the check has been signed by the issuer, (3) that the customer has endorsed the check on the back, and (4) that the check is in good condition, or in other words is not torn or physically damaged. This helps to ensure that the check is properly filled out and signed, and helps to avoid the insertion of a damaged check that might become jammed in the check reader 67. Further, it helps to ensure that, where someone has ripped up a check in order to void it, the check has not been taped back together for the purpose of attempting to negotiate it.

Then, at block 164, the ATM 57 checks to see if the customer has identified any problem with the check. If so, then control proceeds from block 164 back to block 121, where the ATM 57 displays the welcome screen and waits for the next customer. On the other hand, if the customer indicates that the check meets all of the specified criteria, then control proceeds from block 164 to block 166, where the ATM 57 uses the display 62 to request that the customer insert the check into the check reader 67. Since other existing ATMS typically require the use of an envelope for a check, this message also preferably instructs the customer not to put the check in an envelope, because operation of the ATM according to the present invention is different from other ATMs. This message may even optionally include a graphic depiction of how to properly insert the check. The ATM 57 then waits at block 167 for the customer to insert the check.

After the customer has inserted the check into the check reader 67, control proceeds from block 167 to block 168, where the ATM 57 uses the display 62 to display a message requesting that the customer wait while the check is processed. The ATM 57 causes the check reader 67 to scan the check, and then stores the information read from the check, including the MICR line, the monetary amount of the check from the courtesy box, and a digital image of the overall check.

Then, still at block 168, the ATM 57 runs some tests on the MICR line. For example, the MICR line includes an ABA routing number which should normally have a transit symbol at each end, and includes a checking account number which should normally have an ON-US symbol at each end. The ATM 57 verifies that there are exactly two transit symbols around the ABA number, and that there is at least one ON-US symbol after the second transit symbol. Further, the ATM 57 can evaluate whether there are any unreadable characters in the MICR line. Also, the ATM 57 can verify that the MICR line does not end in an amount field which sets forth the amount of the check, because this normally means that the check has already been cashed and processed, and should not be cashed again. The ATM 57 may thus run some or all of these MICR tests, or possibly additional tests.

Control then proceeds to block 169, where a determination is made of whether the MICR tests have revealed any problem. If a problem has been detected, then control proceeds to block 176, where the ATM 57 uses the display 62 to present a message which indicates that there is insufficient information to cash the check, and which invites the customer to use the self-dial telephone 14 to call a customer service representative. This message, and others like it, intentionally provide a limited amount of detail regarding the specific problem detected, in order to reduce the likelihood of fraud. The ATM 57 then causes the check reader 67 to return the check to the return bin 68, so that the customer may retrieve it, and waits briefly in order to give the customer an opportunity to read the screen of the display 62. Control then proceeds from block 176 back to block 121, where the ATM 57 displays the welcome message and waits for the next customer.

If it is determined at block 169 that the MICR test did not reveal any problem, then control proceeds to block 177, where the ATM 57 displays the stored image of the overall check, and requests that the customer look at the displayed check image and enter the amount of the check which is shown on the displayed image. The ATM 57 has already scanned and analyzed the amount in the courtesy box of the check, but does not reveal to the customer what the ATM 57 believes is the correct amount of the check. When the customer has keyed in the amount of the check, based on the displayed image of the check, then at block 178 the ATM 57 compares the entered amount with the amount which it determined from scanning and analyzing the courtesy box of the check. If they do not agree, then control proceeds from block 178 to block 179, where the ATM 57 uses the display 62 to present a message indicating there is an inconsistency, while again displaying the image of the check and also requesting that the customer reenter the amount of the check. When the customer has again reentered the amount of the check, based on the displayed check image, the ATM 57 checks the second entry made by the customer. If it is still not acceptable, then control proceeds to block 182, where the ATM 57 uses the display 62 to present a message which indicates that the amount of the check is in question, and which invites the customer to use the self-dial telephone 14 to contact a customer service representative. The ATM 57 then causes the check reader 67 to return the check to the return 68, so that customer can retrieve it, and waits briefly in order to allow the customer to read the message on the display 62. Control then proceeds from block 182 back to block 121, where the ATM 57 displays the welcome screen and waits for the next customer.

On the other hand, if it is determined at either of blocks 178 and 181 that the check amount entered by the customer is acceptable, then control proceeds to block 183, where the ATM 57 determines whether the check amount is within acceptable limits. In the preferred embodiment, the ATM 57 will not cash a check for an amount less than $10, or for an amount greater than $1,000. If it is determined at block 183 that the amount of the check is outside acceptable limits, then control proceeds to block 184, where the ATM 57 uses the display 62 to present a message that the check amount is too big or too small. The ATM 57 causes the check reader 67 to route the check to the return bin 68, so that the customer can retrieve it, and then waits briefly to give the customer an opportunity to read the message which is being displayed. Control then proceeds from block 184 back to block 121, where the ATM 57 displays the welcome message and waits for the next customer.

If it is determined at block 183 that the amount of the check is within acceptable limits, then control proceeds from block 183 to block 186, where the ATM 57 uses the display 62 to display a message requesting that the customer wait while the transaction is processed. The ATM 57 then sends to the switch system 42 an authorization inquiry, which includes the number of the check-cashing card reader 64, the MICR line and dollar amount of the check which is in the check reader 67, and a location identification number unique to the particular ATM 57. Control then proceeds to block 187, where the ATM 57 waits for a response from the switch system 42.

The manner in which the switch system 42 handles the authorization inquiry from the ATM 57 will now be described with reference to FIG. 5. More specifically, at block 191, the switch system 42 begins by using the card number to retrieve a corresponding account file 49, in a manner similar to that already described above in association with block 131. Then, at block 192, the switch system 42 checks to see if it was able to find a corresponding account file. If not, then the card is probably counterfeit, inactive, or invalid, and control proceeds from block 192 to block 193, where the switch system 42 sends the ATM 57 a response which refuses authorization to cash the check. The switch system 42 then terminates its handling of the authorization inquiry at block 194.

If, however, it was determined at block 192 that the corresponding account file 49 had been located, then control proceeds from block 192 to block 196, where the switch system 42 checks the account file for the card to determine the status of card. In a normal situation, the card will be active and valid. However, the card may have an inactive status if it has not yet been activated through proper completion of the enrollment procedure described above in association with FIG. 2. It is also possible for the card to have some alternative status, such as a "hot card" status, which is a common expression indicating that the card may be stolen or counterfeit. The use of a "hot card" represents a situation which might involve fraud, and it is therefore common for the person or ATM to which the card has been presented to be given authorization to confiscate and/or destroy the card.

In the event that the account file 49 in the switch system 42 indicates that the particular check-cashing card 18 has a status corresponding to a problem, control proceeds from block 196 to 193, where authorization for the check-cashing transaction is refused. On the other hand, if the card has an active and valid status, control proceeds from block 196 to 197, where the switch system 42 checks its account file 49 for the card, in order to determine the expiration date of the card. If the expiration date has already passed, then control proceeds from block 197 to block 193, where the switch system 42 refuses to authorize the particular check-cashing transaction. Otherwise, control proceeds to block 198, where the switch system 142 obtains from its account file 49 the velocity limits for the card, and then checks to see if any of the velocity limits have been exceeded.

More specifically, the velocity limits in the preferred embodiment relate to the number of times that the card has been used within a specified time interval, and a cumulative total of the check amounts which have been cashed within a predetermined time interval. For example, if a card has been used more than five times within an immediately preceding time interval of 24 hours, it is possible that the card has been stolen or is otherwise being fraudulently used, and the current check-cashing transaction may be refused in order to minimize the likelihood of fraud. For similar reasons, if the cumulative total of the amounts of the checks cashed within the immediately preceding 24 hour time interval is greater than a predetermined limit, the current check-cashing transaction may also be rejected. Other types of velocity limits may also be checked at block 198.

If it is determined at block 198 that any one of the specified velocity limits has been exceeded, then control proceeds from block 198 to block 193, where the switch system 42 refuses authorization for the requested check-cashing transaction. Otherwise, control proceeds from block 198 to block 199, where the switch system 42 sends an authorization request to the host system 37, including the card number for the card which is in the card reader 64, and the MICR line and check amount for the check which is in the check reader 67. Then, at block 202, the switch system 42 waits for a response from the host system 37.

Figure 6:
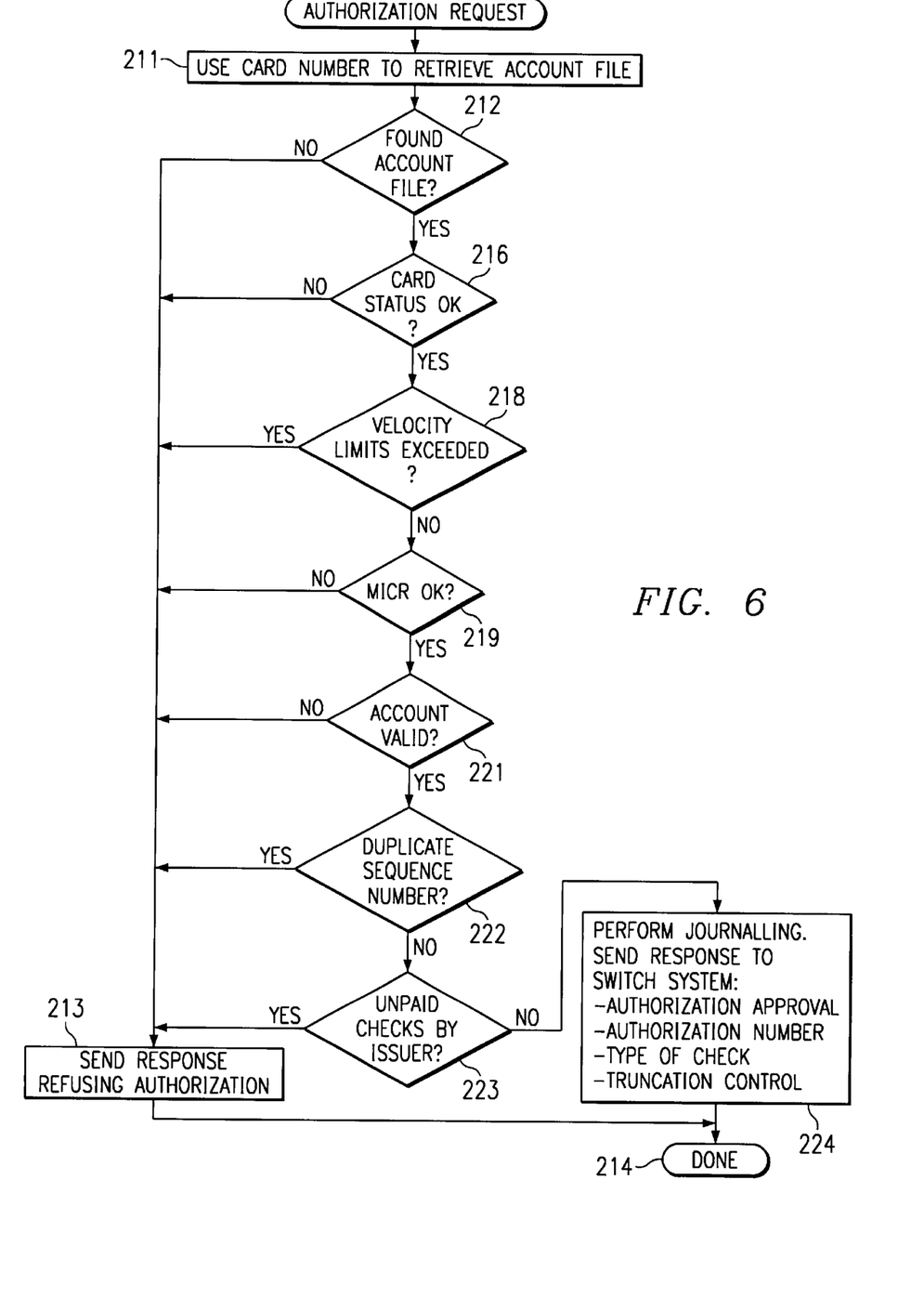
FIG. 6 is a flowchart of one exemplary program executed by a host computer system which is a component of the system of FIG. 1, in order to effect automated check cashing in accord with the present invention.

The manner in which this authorization request is processed by the host system 37 will now be described with reference to FIG. 6. More specifically, at block 211, the host system 37 uses the card number to retrieve one of its account files 46, which corresponds to that particular card. At 212, the host system 37 checks to see if it was able to find such an account file 46. If not, then the card may be counterfeit or inactive, and control proceeds from block 212 to block 213, where the host system 37 sends to the switch system 42 a response which refuses authorization for the current check-cashing transaction. The handling of the authorization request by the host system 37 then terminates at block 214.

On the other hand, if it is determined at block 212 that a corresponding account file has been found, then at blocks 216–218 the host system 37 checks its account file 46 to see if the card status is active and valid, to see whether the card has expired, and to determine whether any velocity limits have been exceeded. The evaluation carried out in blocks 216–218 is similar to that described above in association with blocks 196–198. However, there may be differences. For example, the host system 37 may use velocity limits which are different from those used by the switch system 42. If a problem is encountered in any one of the blocks 216–218, then control proceeds to block 213, where authorization for the current check-cashing transaction is refused.

Otherwise, control will reach block 219, where the host system 37 checks certain aspects of the MICR line scan from the check which is in the check reader 67. The host system 37 may perform tests similar to the MICR tests discussed above in association with block 169 of FIGS. 3A–3D. However, the host system 37 may carry out additional MICR tests, or a variation of the MICR tests which were performed at block 169. In any event, if the host system 37 determines that there is a problem with the MICR line, control proceeds from block 219 to 213, where the host system 37 refuses authorization for the current check-cashing transaction.

If the MICR line passes the test at block 219, then the host system 37 extracts from the MICR line the ABA number and the account number associated with the check, and consults its account information 47 to obtain information regarding the checking account identified by the ABA and account numbers, or in other words the checking account against which the check is written. In particular, at block 221, the host system 37 checks to see if the ABA number and the checking account number together constitute a valid combination which uniquely identifies a particular account, and that the account is one which the customer has previously enrolled (FIG. 2) for use with the check-cashing card 18. At block 222, the host system 37 verifies that the number of the check, which is obtained from the MICR line and known as the sequence number, is not a duplicate of a check which has already been cashed against that particular account. At block 223, the host system 37 checks to see if there are any checks for that particular checking account which have previously been negotiated but were not paid. If the host system 37 detects a problem in any one of the blocks 221–223, then control proceeds to block 213, where the host system 37 refuses authorization for the current check-cashing transaction.

Otherwise, control proceeds to block 224, where the host system 37 performs appropriate journaling, for example by updating information in the account files 46 and in the account information 47 so as to reflect the negotiation and payment of this particular check. The host system 37 then sends to the switch system 42 a response which includes authorization to proceed with the current check-cashing transaction, a unique authorization number for this particular check-cashing transaction, an indication of the particular type of check which has been presented, and an indication of whether the current check-cashing transaction is to involve truncation.

As to the type of check, the host system 37 can determine from its account information 47 whether the check is a payroll check, a government check or a personal check, and can thus send the switch system 42 an identification of what type of check is involved. As to truncation, the issue is whether the check will be negotiated entirely electronically, or whether the check will be negotiated manually by returning the actual paper check back through a chain of financial institutions to the institution which maintains the checking account against which the check is drawn. The institution which maintains the account is permitted to specify whether or not it will permit truncation, or in other words whether it will accept purely electronic negotiation of a check written on any given account. The account information 47 indicates, for each checking account, whether the institution maintaining the account will allow truncation for that account. The host system 37 passes this truncation information back to the switch system 42, so that negotiation of the particular check will be handled in the appropriate manner. After sending a response to the switch system 42 at block 224, the host system 37 terminates its handling of the authorization request at block 214.

Referring again to FIG. 5, and as mentioned above, the switch system 42 waits at block 202 for a response from the host system 37. When a response is received, control proceeds to block 231, where the switch system 42 checks to see whether the host system 37 has granted or refused authorization for the current check-cashing transaction. If authorization has been refused, then control proceeds to block 193, where the switch system 42 sends a response to the ATM 57 which refuses authorization for the check-cashing transaction. On the other hand, if the transaction has been approved, then control proceeds from block 231 to block 232, where the switch system 42 performs any necessary journaling. In other words, the switch system 42 updates its account file 49 for the particular card, and any other pertinent files that it may have, to reflect the negotiation and cashing of the particular check which is currently in the check reader 67.

Then, the switch system 42 uses the location identification number provided by the ATM 57, and the check type information provided by the host system 37, to determine the appropriate rate for the service fee. Thereafter, the switch system 42 uses this rate and the check amount provided by the ATM 57 to calculate the actual service fee. The switch system 42 then subtracts the calculated service fee from the check amount, and will also subtract a predetermined enrollment fee if this is the first time a check has been cashed using this check-cashing card 18. The result of this subtraction is a dispense amount, which is the actual cash amount that the customer will be paid.

The switch system 42 then prepares a text block, which is the information that will be printed on a paper receipt by the ATM 57. This includes information such as the date and time of the transaction, an identification of the particular ATM 57, the authorization number provided by the host system 37, the amount of the check, the amount of the service fee, the amount of the enrollment fee (if any), and the dispense amount. Then, the switch system 42 prepares a text string, which is a line of information that will be printed at the top of the check. In the preferred embodiment, the text string includes a truncation indicator ("TRUNC" or "DEP") to indicate whether or not negotiation is to be electronic, the location identifier of the particular ATM 57, a sequence number which is a sequential numbering of check-cashing transactions at this particular ATM 57, the amount of the check, and the authorization number provided by the host system 37.

The switch system 42 then sends to the ATM 57 a response which indicates that authorization has been granted, along with the authorization number, the dispense amount, the text block, and the text string. Then, at block 194, the handling of the authorization inquiry by the switch system 42 is terminated.

Referring again to FIGS. 3A–3D, and as previously discussed, the ATM 57 waits at block 187 for a response to the authorization inquiry which it sent to the switch system 42. When a response is received, control proceeds from block 187 to block 241, where the ATM 57 checks to see whether the response indicates that the current check-cashing transaction has been authorized. If authorization has been refused, then control proceeds to block 242, where the ATM 57 uses the display 62 to display a message which indicates that it has insufficient information to cash the check, and which invites the customer to use the self-dial telephone 14 to contact a customer service representative. The ATM 57 then routes the check from the check reader 67 to the return bin 68, so that the customer can retrieve it, and also waits briefly in order to give the customer time to read the message which is on the display 62. Control then proceeds back to block 121 of FIGS. 3A–3D, where the ATM 57 displays the welcome screen and waits for the next customer.

Alternatively, however, if it is determined at block 241 that authorization has been granted for the current check-cashing transaction, then control proceeds from block 241 to block 243, where the ATM 57 causes its cash dispenser 74 to dispense an amount of cash equal to the dispense amount specified in the response received from the switch system 42. The ATM 57 also causes the receipt printer 76 to print on a paper receipt the text block provided by the switch system 42, the contents of which were described above. Further, the ATM 57 causes the check printer 71 to print on the check the text string provided by the switch system 42, and then routes the check into the paid bin 72.

Then, the ATM 57 preferably uses the display 62 to display a message instructing the customer to take the cash from the cash dispenser 74, to take the receipt from the receipt printer 76, and to take the card from the card reader 64. The message may explain that the receipt identifies all fees charged for the transaction, to ensure that the customer understands why he or she received the specific amount of cash which was in fact dispensed. The ATM 57 then waits briefly in order to give the customer an opportunity to read this message. Control then proceeds to block 244, where the ATM 57 uses the display 62 to present a message thanking the customer for using this particular check-cashing service. The ATM 57 waits briefly in order to give the customer time to read this message. Then, control proceeds from block 244 back to block 121, where the ATM 57 displays the welcome message, and waits for the next customer.

It will noted from the foregoing discussion that the system 10 carries out the entire check-cashing transaction without verifying that the customer has an institutional account containing funds available for withdrawal. Moreover, a successful check-cashing transaction is entirely automated, and has no human involvement. Thus, once a customer has been enrolled, the customer can subsequently carry out a series of check-cashing transactions which are each completely automated and do not require the customer to have funds available for withdrawal from any funds-containing account owned by the customer. In the preferred embodiment, there is no provision for manual check cashing. That is, the preferred embodiment does not include a human stand-in for the ATM 57, the switch system 42, and/or the host system 37.

In the event that a transaction is rejected by the system 10, the preferred embodiment provides only a visual display indicating that the transaction cannot proceed. However, it would alternatively be possible for the system to cause the receipt printer 76 to print on a physical receipt the same information which is presented on the display in the preferred embodiment.

With reference to FIGS. 3A–3D, and as discussed above, the ATM 57 sends two inquiries to the switch system 42 in the disclosed embodiment. The first inquiry is the PIN inquiry, which is sent at block 126 of FIGS. 3A–3D and which is handled by the switch system 42 in accord with the flowchart of FIG. 4. The second inquiry is the authorization inquiry, which is sent at block 186 of FIG. 3 and which is handled by the switch system 42 in accord with the flowchart of FIG. 5. However, it is alternatively possible for the ATM 57 to send a single inquiry to the switch system 42, which is effectively a combination of the PIN inquiry and the authorization inquiry.

More specifically, in this alternative approach, the ATM 57 would not send the PIN inquiry at the point in the procedure represented by block 126 of FIGS. 3A–3D. Instead, the ATM 57 would delay sending the PIN inquiry until block 186 of FIGS. 3A–3D, and would then send the combined inquiry at block 186. The handling of each portion of the combined inquiry would be similar to the manner in which the PIN inquiry and the authorization inquiry are separately handled in the disclosed embodiment.

An advantage of the present invention is that a customer can cash a check in a completely automated procedure which is both convenient and secure, without any need for the customer to have a bank account or other institutional account. Since an account is not needed, it is also not necessary that the account have funds which are available for withdrawal. Since the transaction is entirely automated, thereby eliminating the need for human interaction, a cost reduction is realized, which can be reflected in either increased profit and/or the capability to provide a lower service fee for the check-cashing transaction. Although one embodiment of a method and apparatus for check-cashing system has been illustrated and described in detail, it will be recognized that various substitutions and alterations are possible without departing from the spirit and scope of the present invention, as defined by the following claims.

What is claimed is:

1. An apparatus comprising:

a check-cashing system, said check-cashing system being operative to automatically determine whether to permit a person to cash a check, without evaluating whether the person has funds available for withdrawal from an account, and to automatically respond to a determination that cashing of the check is permissible by dispensing cash to the person in exchange for the check;

a storage medium in the possession of the person and having information stored thereon, wherein said check-cashing system includes a reader which can removably receive said storage medium and read the information therefrom; and a customer service workstation operatively coupled to said check-cashing system, a first telephone in close proximity to said customer service workstation, a second telephone in close proximity to said reader, said second telephone being operative to automatically establish a toll-free communication path to said first telephone, and a dispenser disposed in close proximity to said second telephone and having therein at least one storage medium which has information stored thereon and which is capable of being removably inserted in the reader.

2. An apparatus according to claim 1, wherein said check-cashing system, in effecting said automatic determination of whether to permit a person to cash a check, is operative to carry out a concurrent evaluation through a communication link of centralized status information for an account against which the check is drawn, still without evaluating whether the person has funds available for withdrawal from a separate funds-containing account.

3. An apparatus according to claim 1, wherein said check-cashing system, in effecting said dispensing of cash, is operative to dispense an amount of cash which is less than the amount of the check by at least an enrollment fee.

4. An apparatus according to claim 1, wherein said check-cashing system, in effecting said automatic determination of whether to permit a person to cash a check, is operative to ask the person to verify that the check meets a predetermined criterion.

5. An apparatus according to claim 1, wherein said check-cashing system, in effecting said automatic determination of whether to permit a person to cash a check, is operative to scan the check, analyze information scanned from the check to determine a dollar amount of the check, display an image of the check, request that the person enter an amount of the check from the displayed image, and compare the amount entered by the person to the dollar amount determined by scanning the check.

6. An apparatus according to claim 1, wherein said check-cashing system, in effecting said automatic determination of whether to permit a person to cash a check, is operative to identify a service fee, and obtain approval of the service fee from the person; and wherein said check-cashing system, in effecting said dispensing of cash, is operative to dispense a dispense amount which is less than the amount of the check by at least the amount of the service fee.

7. An apparatus according to claim 6, wherein said check-cashing system, in effecting said identification of said service fee, is operative to determine the type of check, and use a predetermined service fee which corresponds to the type of check.

8. An apparatus according to claim 1, wherein said check-cashing system, in association with said dispensing of cash, is further operative to issue a printed receipt to the person.

9. An apparatus according to claim 1, wherein said check-cashing system, in association with said dispensing of cash, is operative to print selected information on the check.

10. An apparatus according to claim 1, wherein said check-cashing system, in effecting said automatic determination of whether to permit a person to cash a check, is operative to reject the check if the check is drawn on a checking account other than a pre-approved account.

* * * * *